United States Patent Office 3,250,753
Patented May 10, 1966

3,250,753
POLYMERIZATION OF HYDROCARBON MONO-
MERS WITH A CATALYST CONSISTING OF THE
REACTION PRODUCT OF A DIALKYL ALUMI-
NUM CHLORIDE AND TRIS (p-CHLOROPHEN-
YL) ORTHO-VANADATE
Alfred Peter Kottenhahn, Wilmington, Del., assignor to
E. I. du Pont de Nemours and Company, Wilmington,
Del., a corporation of Delaware
No Drawing. Filed Feb. 20, 1962, Ser. No. 174,410
18 Claims. (Cl. 260—80.5)

This invention relates to a new vanadium coordination catalyst and to a process for its preparation. This invention relates further to a process for the preparation of polymeric materials by polymerization or copolymerization of hydrocarbon monomers in the presence of the new catalyst.

High molecular weight hydrocarbon polymers and copolymers made by the polymerization or copolymerization of related monomers using coordination catalysts are acquiring increasing technical and commercial importance today. In this development, coordination catalysts made from vanadium salts and organo aluminum compounds have exhibited unusual promise. Unfortunately, at 50° C. or above, the activity of these vanadium catalysts tends to deteriorate too quickly for them to be employed advantageously in commercial processes.

It is, therefore, an object of the present invention to provide a new vanadium coordination polymerization catalyst which is useful at temperatures as high as 85° C. A further object is to provide a process for the preparation of the new catalyst. Another object is to provide a process for the preparation of polymeric materials by polymerization or copolymerization in the presence of the new catalyst. It is a further object of this invention to provide a catalyst system for polymerizing alpha monoolefins and for copolymerizing ethylene with selected hydrocarbon monomers in an inert organic liquid at temperatures as high as 85° C. Other objects will appear hereinafter.

These and other objects are accomplished by polymerizing in the presence of the new vanadium coordination catalyst in an inert organic liquid a member selected from the group consisting of (a) alpha monoolefin, (b) ethylene with at least one other alpha monoolefin, and (c) the compounds of (b) with at least one non-conjugated hydrocarbon diene. The terms "polymerizing," "to polymerize," and "polymerization" are to include copolymerizing, etc., when such meaning does not conflict with the surrounding text.

The new catalyst comprises the reaction product of at least 4 molar proportions of an organo aluminum chloride of the formula (alkyl)$_2$AlCl, wherein said alkyl contains no more than 18 carbon atoms, with a molar proportion of an aromatic vanadium salt which is tris(p-chlorophenyl)orthovanadate. The reaction is carried out in an inert organic solvent which is selected from the group consisting of hydrocarbon and halogenated hydrocarbon liquid.

The catalyst system, made by contacting and reacting the above compounds preferably in the presence of an inert liquid solvent, if desired, can serve as the reaction medium when this catalyst system is used to polymerize the above-described monomers.

The new catalyst allows the polymerization or copolymerization of the aforementioned monomer groups to be carried out at temperatures from —30° C. to as high as +85° C., the preferred range being from 50 to 70° C. For practical purposes, the temperature at which the catalyst is prepared, either separately or in the presence of monomers, is within these temperature ranges.

The new catalyst system can be employed for making homopolymers of alpha monoolefins of the formula R—CH=CH$_2$ wherein R is hydrogen or an alkyl radical of no more than 16 carbon atoms. Representative examples of these monoolefins include: ethylene; propylene; 1-butene; 1-pentene; 1-decene; 1-octadecene; and 4-methyl-1-pentene.

In addition, the new catalyst system can be used in making copolymers of ethylene with at least one alpha monoolefin of the formula R'—CH=CH$_2$, wherein R' is an alkyl radical of no more than 8 carbon atoms. Representative examples include: ethylene/propylene; ethylene/1-butene; and ethylene/1-decene/4-methyl-1-pentene. If a copolymer with elastomeric properties is desired, the copolymer should contain about 20 to 75 percent by weight of ethylene units.

The catalyst system can also be employed in the copolymerization of ethylene with at least one alpha monoolefin defined in the second instance above and at least one non-conjugated hydrocarbon diene. Representative dienes include (a) dicyclopentadiene; (b) an aliphatic diene having the formula

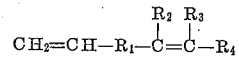

wherein R$_1$ is an alkylene radical, R$_2$ and R$_3$ are independently selected from the group consisting of hydrogen and alkyl radicals and R$_4$ is an alkyl radical and wherein R$_1$ to R$_4$ are so selected that the diene has from about 6 to 22 carbon atoms; (c) a 5-alkenyl-substituted-2-norbornene; (d) a 5-methylene-2-norbornene; and (e) 2-alkyl-2,5-norbornadiene.

If elastomeric properties are desired in the copolymers of ethylene with at least one alpha monoolefin and at least one diene selected from representative groups (a) through (e) above, the ethylene monomer unit concentration should range in general from about 20 percent to about 72.5 percent by weight. Copolymers having more ethylene units tend to be stiff and non-elastomeric. The concentration of R'—CH=CH$_2$ monomer units, wherein R' is C$_1$ to C$_8$ alkyl, should range in general from about 25 percent to about 77.5 percent by weight. Copolymers having more than 77.5 percent of said monomer units, such as propylene, are known to be leathery and boardy.

Representative examples of aliphatic dienes, having the above formula are as follows: 1,4-hexadiene, which is preferred; 1,9-octadecadiene; 6-methyl-1,5-heptadiene; 7-methyl-1,6-octadiene; 11-ethyl-1,11-tridecadiene; 9-ethyl-1,9-undecadiene; 7-ethyl-1,7-nonadiene; 8-propyl-1,8-undecadiene; 8 - ethyl-1,8-decadiene; 10-ethyl-1,9-dodecadiene; 12-ethyl-1,12-tetradecadiene; 13-n-butyl-1,12-heptadecadiene; and 15 ethyl-1,15-heptadecadiene. Dienes such as 11-ethyl-1,11-tridecadiene are made by reacting an alkyl Grignard reagent with the alkyl ester of an ω-unsaturated carboxylic acid and dehydrating the tertiary alcohol thereby produced.

Examples of copolymers of ethylene, at least one alpha monoolefin (defined as R'=C$_1$—C$_8$ alkyl), and at least one of these aliphatic dienes include ethylene/propylene/1,4-hexadiene, which is preferred; ethylene/1-butene/1,4-hexadiene/11 - ethyl - 1,11 - tridecadiene; ethylene/1-butene/1 - octene/6 - methyl - 1,5 - heptadiene; and ethylene/1 - pentene/1,4 - hexadiene/1,9 - octadecadiene.

These copolymers contain ethylenic unsaturation corresponding to an iodine number of at least 3 and preferably not more than 50, and have intrinsic viscosities in tetrachloroethylene at 30° C. of 1.0 to 10 (corresponding to viscosity-average molecular weights of about 30,000 and 700,000 respectively). There are present in the copolymer about 0.1 to 2.5 gram-moles, preferably 0.1 to 1.0 gram-mole, of diene units per kilogram of copolymer.

Another group of copolymers which may be prepared according to the present invention are those copolymers of ethylene, at least one alpha monoolefin as defined above ($R'=C_1-C_8$ alkyl) and dicyclopentadiene. Representative examples include ethylene/propylene/dicyclopentadiene, which is preferred; ethylene/1 - butene/dicyclopentadiene; ethylene/propylene/1 - butene/dicyclopentadiene; ethylene/1 - octene/dicyclopentadiene; ethylene/propylene/1 - hexene/dicyclopentadiene; ethylene/1 - heptene/1 - decene/dicyclopentadiene; and ethylene/5-methyl-1-heptene/dicyclopentadiene.

In order that these copolymers be elastomeric, they should contain at least about 20 percent ethylene monomer units by weight, at least about 25 percent $$R'-CH=CH_2$$

monomer units (as previously described) by weight, and no more than about 25 percent dicyclopentadiene monomer units by weight. The copolymer has an iodine number between about 5 and 50. There are present in the copolymer about 0.1 to 2.5 gram-moles, preferably 0.1 to 1.0 gram-mole, of diene units per kilogram of copolymer.

Still another group of copolymers which may be prepared and isolated are those copolymers of ethylene, at least one alpha monoolefin as defined above and a 5-alkenyl - substituted - 2 - norbordnene or 5 - methylene-2-norbornene.

To obtain 5 - methylene - 2 - norbornene, allene having the formula $H_2C=C=CH_2$ is heated in the absence of a polymerization initiator with cyclopentadiene. Preferably the reaction is carried out at a temperature of 175–225° C. and still more preferably above 200° C. and in the presence of an addition polymerization inhibitor. The broad temperature operating range is generally between about 150° and 250° C. The pressure under which this reaction is carried out is not critical. Good results are obtained when the reactants are heated in a closed container under the autogenous pressure developed by the reactants under the operating conditions. The reaction vessel can be constructed of any material which is inert to the reactants and is capable of withstanding the operating pressures. Reaction vessels made of glass, stainless steel and glass-lined steel are quite satisfactory. The reaction time can be varied widely. Times ranging from 2–24 hours or more at 150° C. to 250° C. are operable. Very good results are obtained in reaction periods ranging from 4 to 16 hours. Reactants which are commercially available in the grades used for polymerization are satisfactory for use in making 5-methylene-2-norbornene. However, best results are obtained when the allene is relatively pure.

Representative examples of copolymers of ethylene, at least one alpha monoolefin and 5-methylene-2-norbornene include ethylene/propylene/5 - methylene - 2 - norbornene; ethylene/1 - butene/5 - methylene - 2 - norbornene; ethylene/1 - decene/5 - methylene - 2 - norbornene; ethylene/5,5 - dimethyl - 1 - octene/5 - methylene - 2-norbornene; ethylene/4 - methyl - 1 - hexene/5 - methylene - 2 - norbornene; ethylene/4,4 - dimethyl - 1 - pentene/5 - methylene - 2 - norbornene; ethylene/5,6,6 - trimethyl-1-heptene/5-methylene-2-norbornene.

The 5-methylene-2-norbornene diolefin monomer units should be present in sufficient amount to provide for sulfur curability, i.e., at least about 0.03 gram-mole per 100 grams of elastomer, while the maximum amount present by weight should be such as to not interfere seriously with the elastic character of the product, i.e., not over about 20 percent by weight.

As another indication of adequate curability, the iodine number of the copolymer should be at least 5. The iodine number is a measure of the total unsaturation of the polymer and this unsaturation arises from (1) the methylene radical of 5-methylene-2-norbornene and (2) the terminal groups of the polymer chain which, based on infrared evidence, have a double bond of the vinylidene type:

Iodine numbers in excess of about 60 are undesirable in that values higher than this are not needed for curability and may indicate the presence of excessive amounts of diene component.

The 5-alkenyl-2-norbornenes may be described by the following formula

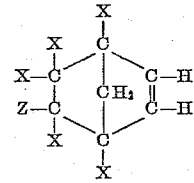

wherein each X represents hydrogen or a monovalent alkyl radical of from 1 to 6 carbon atoms; Z represents a monovalent alkenyl radical, the carbon-to-carbon double bond therein being internal.

A wide variety of 5-alkenyl-2-norbornenes can be made for use in the present invention by the Diels-Alder addition of both conjugated and non-conjugated hydrocarbon dienes to cyclopentadienes having the formula

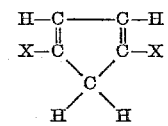

in which X is heretofore described; the X's can be the same or different. The reaction is carried out at autogenous pressure in a closed inert (e.g. glass and stainless steel) container at temperatures ranging between about 150 to 250° C., preferably 175–225° C., for times ranging between about 2 to 24 hours. It is preferred that an additional polymerization inhibitor (e.g. hydroquinone) be present. Representative syntheses of this type are: the formation of 5-(2'-butenyl)-2-norbornene from cyclopentadiene and 1,4-hexadiene; the preparation of 5-(1'-propenyl)-2-norbornene from cyclopentadiene and 1,3-pentadiene (often called piperylene).

The reaction of cyclopentadiene with conjugated dienes having the structure $X'-CH=CH-CH=CH-X''$, where $X'$ and $X''$ are alkyl radicals, can be used to prepare 6-alkyl-5-alkenyl-2-norbornenes having the structures

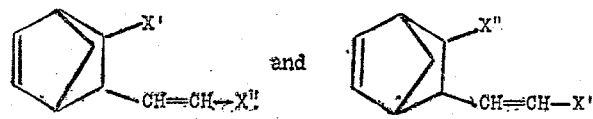

The reaction of cyclopentadiene with unsymmetrical non-conjugated dienes of the structure $$CH_2=CH-CH_2-CH=CH-Q$$

where Q is an alkyl radical will lead to 5-(2-alkenyl)-2-norbornenes

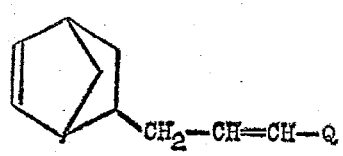

The reaction of cyclopentadiene with conjugated dienes of the formula $CH_2=CH-CH=CH-Q'$, where $Q'$ is an alkyl radical, will produce

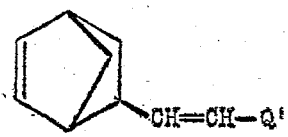

The 2-norbornenes having the structures

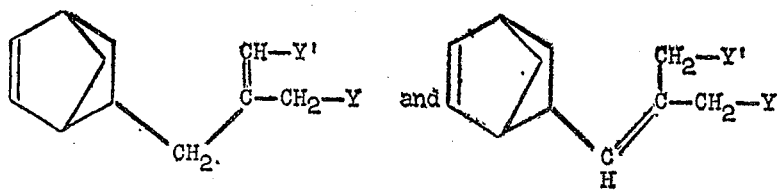

where Y is H or alkyl and Y' is alkyl, are made by reacting the Grignard reagent of 5-bromomethyl-2-norbornene in ether with ketones having the structure $$Y-CH_2-\overset{O}{\underset{\|}{C}}-CH_2-Y'$$

and dehydrating the resulting tertiary carbinol in refluxing toluene in the presence of anhydrous copper sulfate. The preparation of 5-(2'-ethyl-2'-butenyl)-2-norbornene from diethyl ketone is typical.

Representative examples of the heretofore described 2-norbornenes include: 5-(2'-ethyl-2'-butenyl)-2-norbornene; 5-(2'-ethyl-1'-butenyl)-2-norbornene; 5-(2'-methyl-1'-propenyl)-2-norborene; 5-(2'-propyl-2'-pentenyl)-2-norbornene; 5-(2'-hexyl-2'-undecenyl)-2-norbornene; 5-(2'-nonyl-2'-heptenyl)-2-norbornene; 5 - (2' - butyl-1'-pentenyl)-2-norbornene; 5 - (2' - pentyl-1'-octenyl)-2-norbornene; 5-(2'-heptyl-1'-undecenyl)-2-norbornene; 5-(2'-methyl-2'-butenyl)-2-norbornene; 5 - (2'-methyl-2'-decenyl)-2-norbornene; 5 - (2' - methyl-1'-butenyl)-2-norbornene; 5-(2'-methyl-1'-hexenyl)-2-norbornene; 5-(2'-methyl-1'-undecenyl)-2-norbornene; 5-(2'-hexyl-2'-butenyl)-2-norbornene; 5-(2'-octyl-2'-butenyl)-2-norbornene; 5-(2'-ethyl-2'-decenyl)-2-norbornene; and 5-(2'-ethyl-1'-octenyl)-2-norbornene.

Representative examples of copolymers of ethylene, at least one alpha monoolefin (R'=C$_1$–C$_8$ alkyl) and a 5-alkenyl-2-norbornene include: ethylene/propylene/5-(2'-butenyl) - 2 - norbornene; ethylene/propylene/5-(2'-ethyl-2'-butenyl) - 2 - norbornene; ethylene/propylene/5-(2'-ethyl-1'-butenyl)-2-norbornene; ethylene/propylene/ 5-(1'-propenyl)-2-norbornene; ethylene/1-butene/5-(2'-heptyl-1'-undecenyl)-2-norbornene; ethylene/1-butene/5-(2'-butenyl)-2-norbornene; ethylene/1-butene/-(2'-ethyl-2'-butenyl)-2-norbornene; ethylene/4,4-dimethyl-1-hexene/5-(2'-propyl-2'-pentenyl) - 2 - norbornene; ethylene/5,5-dimethyl-1-octene/5-(2'nonyl-2'-heptenyl)-2 - norbornene; ethylene/6-methyl-1-heptene/5-(2'-methyl-2'-decenyl) - 2 - norbornene; ethylene/1-decene/5-(2'-hexyl-2'-butenyl)-2-norbornene; and ethylene/5,6,6-trimethyl-1-heptene/5-(2'-octyl-2'-butenyl)-2-norbornene.

The 5-alkenyl-2-norbornene diolefin monomer units should be present in sufficient amount to provide for sulfur curability, i.e., at least about 0.03 gram-mole per 100 grams of elastomer, while the maximum amount present by weight should be such as to not interfere seriously with the elastic character of the product, i.e., not over about 20 percent by weight.

As another indication of adequate curability, the iodine number of the copolymer should be at least 5. The iodine number is a measure of the total unsaturation of the polymer and this unsaturation arises from two sources (1) the alkenyl radical of the 5-alkenyl-2-norbornene and (2) the terminal groups of the polymer chain which, based on infrared evidence, have a double bond of the vinylidene type:

Iodine numbers in excess of about 60 are undesirable in that values higher than this are not needed for curability and may indicate the presence of excessive amounts of diene component.

Still another group of copolymers which may be prepared are copolymers of ethylene, at least one alpha monoolefin as defined above and a 2-alkyl-substituted-2,5- norbornadiene. Representing examples include: ethylene/propylene/2 - methyl - 2,5 - norbornadiene; ethylene/propylene/2-ethyl-2,5-norbornadiene; ethylene/1-butene/2-methyl-2,5-norbornadiene; ethylene/1-hexene/2-ethyl-2,5-norbornadiene; ethylene/1-decene/2-butyl-2,5-norbornadiene; and ethylene/1-heptene/2-octyl-2,5-norbornadiene.

The 2-alkyl-2,5-norbornadienes can be described by the following structural formula

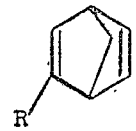

where R is a C$_1$–C$_8$ alkyl radical. These dienes are made by heating acetylenes having the formula R—C≡C—H, where R is a C$_1$–C$_8$ alkyl radical, with cyclopentadiene at 175–225° C. in the absence of a polymerization initiator. Closed reaction vessels made from stainless steel or glass-lined steel are satisfactory.

In making the novel catalyst of this invention, the order of addition is not critical. Thus one can first add the vanadium compound or the aluminum compound or one can add both of them simultaneously. The coordination catalyst can be made in the presence or absence of monomers. Sufficient organo aluminum compound is supplied so that the value of the molar ratio of aluminum to vanadium is at least 4:1. When the value is lower, the yield of polymer made from this catalyst appears to decrease sharply. The preferred value is 4:1. The yield tends to decrease slightly as the value of the ratio is increased above 4:1; however, values as high as about 8:1 can be employed when desired. The concentration of vanadium in the polymerization mixture should range from about 0.00005 to 0.5 molar with 0.0005 to 0.005 molar being preferred; however, stronger or more dilute catalyst solutions can be made which are diluted or concentrated, respectively, to attain these values.

Representative organo aluminum chlorides include: diisobutyl aluminum chloride, which is preferred; diethyl aluminum chloride; di-n-hexyl aluminum chloride; di-n-dodecyl aluminum chloride; dioctadecyl aluminum chloride; and decyl ethyl aluminum chloride.

The catalyst can be used in any liquid medium or mixtures of liquid media suitable for polymerizations with coordination catalysts. Tetrachloroethylene is the preferred liquid medium. Other halogenated hydrocarbons, such as methylene chloride, ethyl chloride, 1,2-dichloroethane, and ortho-dichlorobenzene can be employed. Suitable liquid media also include aliphatic hydrocarbons, such as n-pentane, n-heptane, cyclohexane, and cyclopentane, and aromatic hydrocarbons such as benzene, toluene, and mixed xylenes. The catalyst can be made in one solvent and the resulting solution dispersed in another, the original solvent being removed, if desired. Normally liquid or liquified monomers can be employed in place of part or all of the solvent. The catalyst of this invention can be stored in the absence of oxygen, carbon dioxide, or compounds containing Zerewitinoff-active hydrogen atoms (such as water, alcohols, and carboxylic acids).

In general, the catalyst of the present invention can be used in polymerizations or copolymerizations carried out at atmospheric, subatmospheric, or superatmospheric pressure. Useful temperatures range from about −30 to +85° C. It is generally inconvenient to operate at temperatures below about −30° C. because additional cooling equipment is required; furthermore, at temperatures much below −30° C. the reaction rate is undesirably reduced and it is more difficult to prepare copolymers of suitable composition. The activity of the catalyst of the present invention tends to decrease as the temperature is raised; however, this catalyst, unexpectedly, displays outstanding activity at temperatures as high as 50° C. and permits attainment of satisfactory yields at even higher temperatures such as 60 or 70° C.; at temperatures about 85° C. the yield of product obtained is no longer entirely satisfactory.

As is shown in Example 1, which follows, the catalyst of the present invention is distinctly superior to representative known trialkyl orthovanadate catalysts at 50° C. Under comparable conditions the tris(p-chlorophenyl) orthovanadate catalyst gave a yield of 15.37 grams of an ethylene copolymer, whereas the triethyl orthovanadate catalyst gave 10.15 grams, vanadium oxytrichloride gave 5.95 grams, and tri-tert-butyl orthovanadate gave only 3.6 grams. Example 2 shows that at 70° C. the novel catalyst gave a yield of 3.30 grams of copolymer whereas vanadium oxytrichloride gave only 0.78 gram. At 85° C., the novel catalyst gave 0.97 gram; in contrast no yield at all was isolated when vanadium oxytrichloride was employed.

In general, an inert medium is used during the polymerization reaction. Zerewitinoff-active hydrogen atoms, oxygen, carbon dioxide, and other catalyst poisons should be rigidly excluded from the polymerization medium. The reaction vessel and feed lines should be swept by an inert gas such as purified nitrogen or argon before introduction of monomer gases. Drying towers containing silica gel and an aluminum trialkyl compound are recommended for scrubbing monomer gases before they contact the coordination catalyst. Normally liquid monoolefins and non-conjugated dienes can be purified by fractional distillation and subsequent passage through silica gel.

Any material which is inert to the reactants is suitable for the reaction vessel. Glass, glass-enamel, or stainless steel are satisfactory. The reactor should be equipped with means for agitation. For runs at atmospheric pressure, the monomer gas inlet tube opening can be above or below the liquid surface of the reaction mixture. The gas outlet tube should have suitable traps to prevent the inflow of outside air.

As has been stated above, the catalyst of the present invention is generally used in a liquid monomer diluent or an inert liquid medium. When tetrachloroethylene is the representative inert liquid medium employed, the copolymers generally tend to form in solution. For convenient stirring, it is preferred that the concentration of polymer not exceed 5% by weight, although it is to be understood that higher concentrations can be employed. Lower concentrations require inconvenient and economically more costly recovery of the solvent. When methylene chloride is employed as the reaction medium, ethylene copolymers are obtained in slurry form if the total concentration of monomers is below 2 molar and the temperature is below the normal boiling point of methylene chloride.

The polymerization is started by contacting the monomers with the novel coordination catalyst. This catalyst can be premixed outside the reaction zone and subsequently introduced therein. Alternatively it can be formed, wholly or partially, in situ: the orthovanadate or the dialkyl aluminum chloride or both can be introduced into the reaction zone. By way of illustration, one can heat 1,4-hexadiene and tris(p-chlorophenyl)orthovanadate in tetrachloroethylene to the desired reaction temperature and then, in turn, introduce diisobutyl aluminum monochloride and an ethylene/propylene gas mixture; one can heat tris(p-chlorophenyl)orthovanadate in tetrachloroethylene, add 1,4-hexadiene together with diisobutyl aluminum chloride, and finally introduce an ethylene/propylene gas mixture.

In carrying out the polymerization process, the monomers are introduced, separately or in admixture, at a rate equal to or in excess of the rate at which polymer is formed. All of the monomers can be present before the run is started, alternatively, part or all of the monomers may be added during the polymerization. This introduction may be continuous or periodic.

The polymerization is stopped by deactivating the catalyst with an alcohol such as isopropanol. The polymers formed are isolated by conventional filtration when a slurry has been formed, or by evaporating the solvent or pouring the solvent into a liquid which is nonsolvent for the polymer when the polymer is in solution. In general, the polymer is treated with an aqueous mineral acid, for example, 10% HCl, to remove vanadium and aluminum salts, the solution or slurry thereafter being washed with distilled water until the washings are acid-free. A non-volatile antioxidant, such as 2,2′-methylene bis(6-tert-butyl-4-methylphenol) or 4,4′-thiobis(2-tert-butyl-5-methylphenol) is often incorporated prior to the final isolation step to minimize possible oxidation and degradation of the polymer product.

The polymers can be prepared from the novel catalyst by a continuous process at atmospheric or superatmospheric pressure. Thus the inert medium, the aluminum and the vanadium compounds, and monomers may be introduced continuously into a polymerization zone at such a rate as to provide a residence time sufficient to build up the desired concentration of polymer in the polymerization mass. The residence time may vary widely from about 5 minutes to several hours or more. In general, residence time will be shorter as the concentrations of reactants and catalysts in the feed stream are increased and as the temperature is raised. The polymerization mass which continually flows from the polymerization zone is contacted in a subsequent zone with a catalyst deactivator; the polymer is ultimately continually obtained after suitable continuous purification and isolation procedures similar to those described above. If desired, the copolymer produced by the continuous reaction can be purified and isolated by batch procedures.

Representative examples illustrating the present invention are as follows. Percents and parts are by weight unless otherwise indicated.

*Example 1*

(A) Preparation of ethylene/propylene/1,4-hexadiene copolymer at 50° C. at atmospheric pressure.

The reaction flask was a 1.5-liter glass resin flask equipped with a mechanical stirrer, a thermometer, a gas inlet tube, a gas outlet tube, and a liquid inlet tube covered with a rubber (serum) cap. This apparatus was flame-dried and allowed to cool under a stream of purified nitrogen which was maintained during subsequent operations until monomer gases were introduced.

One liter of tetrachloroethylene at about 25° C. was filtered through a column of silica gel directly into the reaction flask. The rapidly stirred tetrachloroethylene was then sparged with the purified nitrogen while being heated to 50° C. Then 437 milligrams of solid tris(p-chlorophenyl)orthovanadate was added. After the resulting 0.001 molar solution (vanadium basis) had been sparged for several minutes with nitrogen, 5 ml. of a 1 molar solution of diisobutyl aluminum monochloride in tetrachloroethylene were introduced through the serum cap from a syringe; the aluminum:vanadium molar ratio of the resulting catalyst was 5.0. One minute later 5 ml. of 1,4-hexadiene, which had been passed through alumina shortly before the experiment and kept under nitrogen, were added by a syringe to give a 0.0425 molar concentration. At the same time the nitrogen feed was stopped and a feed stream supplying ethylene and propylene at respective rates of one and 3 liters per minute was introduced into the reaction vessel below the liquid surface. These monomers had been purified by passage through a molecular sieve.

For 60 minutes the reaction mixture was agitated at 50° C. while monomer gases were continually introduced at the above described rates. The viscosity of the solution increased slowly during this period. Then 10 ml. of isopropyl alcohol were added to stop the reaction by deactivating the catalyst. The polymer solution was extracted twice with 300-ml. portions of 9 normal hydrochloric acid, washed with about 500 ml. of distilled water, and pan-dried overnight. The soft polymer thereby obtained was mill-dried to give 15.37 grams of product.

Infrared analysis of a pressed film indicated that the copolymer contained 58.8 weight percent ethylene monomer units, 37% propylene monomer units, and 4.2% 1,4-hexadiene monomer units.

(B) The procedure of Part A above was repeated substituting an equivalent amount of $VO(OC_2H_5)_3$ for tris-(p-chlorophenyl)orthovanadate. The copolymer obtained weighed 10.15 grams.

(C) The procedure of Part A above was repeated except that the catalyst was prepared by introducing 1 ml. of 1 molar solution of vanadyl trichloride in tetrachloroethylene and 1.5 ml. of a 1 molar solution of diisobutyl aluminum monochloride in tetrachloroethylene, the aluminum:vanadium molar ratio of the catalyst thus formed having a value of 1.5. The copolymer obtained weighed 5.95 grams; the infrared spectrum of a pressed film indicated that the copolymer contained 65.9% by weight ethylene monomer units, 30% propylene monomer units and 4.1% 1,4-hexadiene monomer units.

(D) The procedure of Part A above was repeated except that tri-tert-butyl orthovanadate was substituted for the aromatic vanadium catalyst. The copolymer obtained weighed 3.6 grams.

(E) The procedure of Part A above was repeated except that an equivalent amount of $VO(O\text{-phenyl})_2\text{-Cl}$ was substituted in place of the vanadium catalyst called for. The copolymer resulting weighed 7.95 grams.

(F) The procedure of Part A of Example 1 was repeated except that an equivalent amount of diisobutyl aluminum monobromide was substituted for diisobutyl aluminum monochloride. 3.9 grams of copolymer were obtained.

*Example 2*

(A) Preparation of ethylene/propylene/1,4-hexadiene copolymer at 70° C. at atmospheric pressure.

The procedure of Example 1, Part A was repeated except that the temperature was 70° C. The copolymer obtained weighed 3.48 grams.

(B) The procedure of Example 2A was repeated except the catalyst was made by introduction of 1 ml. of 1 molar vanadium oxytrichloride in tetrachloroethylene and 1.5 ml. of a 1 molar solution of diisobutyl aluminum monochloride in tetrachloroethylene, the resulting catalyst having aluminum:vanadium in a molar ratio of 1.5:1.0. The copolymer obtained weighed 0.78 gram.

*Example 3*

Ethylene/propylene/1,4-hexadiene copolymer made at 25° C. at atmospheric pressure in benzene.

A 500-ml. glass resin flask was used equipped with a thermometer, gas inlet and outlet tubes, a mechanical stirrer, and a liquid inlet tube covered with a rubber (serum) cap. This apparatus was flame-dried and allowed to cool under a stream of purified nitrogen which was maintained during subsequent operations until monomer gases were introduced.

200-ml. of silica gel-dried benzene were introduced and subsequently sparged with purified nitrogen for about 5 minutes. After 260 mg. of tris(p-chlorophenyl)-orthovanadate had been introduced to give a 0.0029 molar concentration of vanadium, 2 ml. of 1,4-hexadiene were added. Immediately afterward the nitrogen stream was shut off and the agitated mixture was saturated at 25° C. with a monomer gas mixture supplying ethylene and propylene at respective rates of 0.14 liter per minute and 0.36 liter per minute. After monomer gases had been introduced for about 15 minutes, the reaction was started by introduction of 0.6 ml. of diisobutyl aluminum monochloride; the molar ratio of aluminum:vanadium in the resulting catalyst was 5.5:1.0. For 30 minutes the reaction mixture was agitated at about 25° C. while monomer gases were introduced at the above-described rates. A trace of insoluble material formed after about 25 minutes. At the end of 30 minutes, 10 ml. of isopropyl alcohol were introduced to deactivate the catalyst and stop the polymerization. The solution was then extracted twice with 100 ml. of 9 normal hydrochloric acid finally with 200 ml. of distilled water, and slowly poured into 700 ml. of acetone. The copolymer which coagulated was filtered off and dried at 95° C. in a circulating air oven overnight. The soft copolymer obtained weighed 3.72 grams and contained, according to an infrared analysis of a pressed film, 56.4% by weight ethylene monomer units 38% propylene monomer units, and 5.6% 1,4-hexadiene monomer units.

*Example 4*

(A) Preparation of ethylene/propylene/1,4-hexadiene copolymers at 70° C. at superatmospheric pressure.

The shaker bottle of a Parr hydrogenator (storage tank disconnected) was fitted with a thermocouple well and connected to the reducer valve of a monomer storage tank with a pressure hose. The pressure line contained a T-joint equipped with a valve. The elbow of the T-joint was fitted with a rubber hose and a double stopcock connected to nitrogen and vacuum lines. The shaker tube was wrapped with heating tape to allow electrical heating.

(B) After the system had been flushed with nitrogen, the reactor bottle was loaded under nitrogen in turn with 200 ml. of tetrachloroethylene, 260.1 mg. of tris(p-chlorophenyl)orthovanadate, and 2 ml. of 1,4-hexadiene. The system was evacuated, returned to atmospheric pressure with nitrogen (twice repeated), evacuated and pressured with a monomer gas mixture containing ethylene and propylene in 1:2.65 molar proportions (twice repeated), and then pressured with the monomer gas mixture. After heating and agitation had been begun, the pressure bottle was heated to 68° C. Then agitation was stopped, the pressure was released, and the top of the bottle opened enough to allow addition of 2 ml. of a 1.5 molar diisobutyl aluminum monochloride solution in tetrachloroethylene by means of a hypodermic syringe.

The vanadium concentration in the reactor was 0.0029 molar; the 1,4-hexadiene monomer concentration was initially 0.085 molar. The aluminum concentration was 0.015 molar (Al:V was about 5:1). The bottle top was again closed and the system was pressured to 20 p.s.i. with the ethylene/propylene monomer gas mixture. After the mixture had been agitated at 70° C. under a monomer gas pressure of 20 p.s.i. for one hour, the monomer feed was closed off, the system was vented to the atmosphere, and the pressure bottle was disconnected. The mixture was cooled to about 60° C. and 10 ml. of isopropyl alcohol were added to stop the reaction.

The reaction solution was twice washed with 100 ml. of hydrochloric acid, once with distilled water, and coagulated with 600 ml. of acetone. The rubbery precipitated copolymer, collected by filtration through a cheesecloth, was dried overnight at 90° C. to a constant weight of 2.75 grams. Infrared analysis of a pressed film indicated that this copolymer contained 49% by weight ethylene monomer units, 46% propylene monomer units, and 5% trans-1,4-hexadiene monomer units.

(C) The procedure of Example 4B was repeated except as follows: 200 ml. of tetrachloroethylene containing 2 ml. of 1,4-hexadiene were heated in the bottle to 70° C. Then, in turn, there were added 0.2 ml. of a 1 molar solution in vanadium oxytrichloride in tetrachloroethylene and 0.25 ml. of 1.5 molar solution of diisobutyl aluminum chloride in tetrachloroethylene. After a mixture of ethylene and propylene (molar ratio of ethylene to propylene 1:2.6) had been pressured to 20 p.s.i. (gauge) the mixture was shaken for 30 minutes at 70° C. No gas uptake was observed. The catalyst was deactivated with 10 ml. of isopropyl alcohol and the mixture poured into 600 ml. of acetone. Only a trace of coagulated copolymer appeared.

The above procedure was repeated at a higher ethylene/propylene pressure and with a reverse order of addition of catalyst components. After the 200 ml. of tetrachloroethylene and 2 ml. of 1,4-hexadiene had been heated to 70° C., 0.25 ml. of 1.5 molar diisobutyl aluminum monochloride in tetrachloroethylene was introduced. Immediately afterward, 0.2 ml. of 1 molar vanadium oxytrichloride in tetrachloroethylene was added. Ethylene/propylene monomer gas mixture was pressured into a pressure of 60 p.s.i. (gauge) and the mixture shaken thereafter for 30 minutes at 70° C. After the unreacted gases had been vented and 10 ml. of isopropyl alcohol had been introduced, the mixture was stirred into 600 ml. of acetone; about 0.3 gram of copolymer was obtained.

(D) The general procedure of Example 4B was repeated except that diisobutyl aluminum monofluoride was substituted for the diisobutyl aluminum monochloride. When 0.6 ml. of the organo aluminum compound had been introduced from a syringe to give a 0.018 molar concentration, the reactor solution color changed from red-brown to black-brown. After 1 hour no gas uptake had occurred however. After 10 ml. of isopropyl alcohol had been introduced, the mixture then was poured into 600 ml. of acetone. No copolymer precipitated.

*Example 5*

The general procedure of Part B of Example 4 was repeated except that the reaction time was varied as follows: 20 minutes, 40 minutes, 60 minutes, and 120 minutes. The copolymers thereby obtained had the following characteristics:

| Reaction time at 70° C. (min.) | Yield (grams) | Percent Propylene | Percent Diene |
|---|---|---|---|
| 20 | 2.16 | 39 | 4.9 |
| 40 | 2.63 | 46 | 4.4 |
| 60 | 3.04 | 46 | 4.5 |
| 120 | 3.87 | 52 | 4.2 |

These data show that most of the copolymers were formed in the first 20 minutes of the runs made at 70° C.

*Example 6*

Preparation of ethylene/propylene/1,4-hexadiene copolymers at 85° C. at superatmospheric pressure.

When the procedure of Example 4B above was repeated except that: (a) the temperature was raised to 77° C. before the addition of the aluminum compound and the monomers and (b) the polymerization itself was carried out at 85° C., 0.97 gram of copolymer was obtained. This product contained 50.2% ethylene monomer units by weight, 45% propylene monomer units by weight, and 4.8% 1,4-hexadiene monomer units by weight.

*Example 7*

Preparation of ethylene/propylene/11-ethyl-1,11-tridecadiene copolymer at 70° C. at superatmospheric pressure.

The general procedure of Example 4B was repeated except that 11-ethyl-1,11-tridecadiene was substituted for 1,4-hexadiene; its initial concentration in the reactor was 0.086 molar. The tetrachloroethylene solution was heated to 62° C. before the aluminum compound and the ethylene/propylene monomer mixture were introduced. The copolymer obtained weighed 5.33 grams and contained 37% by weight ethylene monomer units, 54% propylene monomer units and 9% 11-ethyl-1,11-tridecadiene monomer units.

*Example 8*

Preparation of ethylene/propylene copolymer at 70° C. at superatmospheric pressure.

The procedure of Example 4B was repeated except that the 1,4-hexadiene was omitted and the temperature was about 62° C. at the time the aluminum compound and the ethylene/propylene monomer mixture were introduced. The copolymer obtained weighed 9.28 grams and contained 70% by weight propylene monomer units.

*Example 9*

Influence of variations in Al:V molar ratio on the formation of ethylene/propylene/1,4-hexadiene copolymer at 70° C. at superatmospheric pressure.

The pressure bottle reactor described in Example 4A above was employed. In accordance with the procedure of Example 4B, the shaker bottle was filled, in turn, with 200 ml. of tetrachloroethylene, 260.4 mg. of tris(p-chlorophenyl)orthovanadate, and 2 ml. of 1,4-hexadiene. After the bottle had been heated to 57° C., 1.5 ml. of a 1.5 molar solution of diisobutyl aluminum monochloride in tetrachloroethylene were introduced, from a syringe. The mixture was then pressured with a (molar ratio 1:2.6) ethylene/propylene monomer mixture to a pressure of 20 p.s.i. (gauge) and shaken for 1 hour at 70° C. The aluminum:vanadium molar ratio had a value of 3.9:1. After the reaction had been stopped as described in 4B above with isopropyl alcohol and the polymerization mixture had been twice extracted with 100 ml. of 9 N hydrochloric acid and 100 ml. of distilled water, and coagulated with 600 ml. acetone, the precipitated copolymer was filtered off, washed with fresh acetone, and dried overnight in a vacuum oven at 95° C. 1.85 grams of tough copolymer were obtained analyzing for 36% propylene monomer units and 4.8% 1,4-hexadiene monomer units.

(B) When the above procedure as repeated except that the amount of aluminum compound was increased so that the value of the aluminum:vanadium molar ratio was 4.5:1, there were obtained 3.07 grams of soft copolymer analyzing for 45% by weight propylene monomer units and 4.2%, 1,4-hexadiene monomer units.

(C) When the above procedure was repeated except that the aluminum:vanadium molar ratio was raised to 5.7:1, 2.66 grams of copolymer were obtained, analyzing for 41% by weight propylene monomer units and 4.3% by weight 1,4-hexadiene monomer units.

(D) The above procedure was repeated except that the aluminum:vanadium molar ratio had a value of 6.7:1. The yield was 2.37 grams of copolymer, containing 39% by weight propylene monomer units and 4.8% 1,4-hexadiene monomer units.

(E) When the above procedure was repeated except that the aluminum:vanadium molar ratio was 7.75:1, 2.4 grams of copolymer were isolated, analyzing for 39% propylene units and 4.7% 1,4-hexadiene monomer units.

*Example 10*

The apparatus was a modified Parr hydrogenator. A 500-ml. glass pressure bottle served as the reaction vessel. A line from a cylinder of very pure ethylene gas was joined at T-joint X to a line from a cylinder of very pure propylene. Beyond the T-point was valve B which joined a line leading to a second T-joint (Y). One end of T-joint Y was equipped with a screw cap, the other end led through a 3-inch length of ¼"-outer diameter copper tubing to valve C, attached, in turn, to a line going through and ending just below the pressure bottle cap. A thermocouple was fitted in the bottle cap and extended to the bottom of the bottle. In the line between the propylene cylinder and T-joint X was a T-joint Z which led to valve A in turn connected to a gas outlet trap containing "Nujol" oil.

13

The shaker bottle was charged with 200 ml. of cyclohexane, 260.8 mg. of tris(p-chlorophenyl)orthovanadate (giving a 0.0029 molar concentration), and 2 ml. of 1,4-hexadiene (giving a 0.085 molar concentration). The bottle was then attached to the modified Parr apparatus and flushed three times with purified nitrogen and three times with monomer gas mixture (molar ratio of ethylene:propylene was 1:2.6). After the valve at the top of the bottle had been closed the bottle was heated to about 55° C. The storage chamber over the bottle was loaded with 3 ml. of 1.5 molar solution of diisobutyl aluminum monochloride in cyclohexane (Al:V was about 7.8:1). This solution was then pressured into the bottle with 60 lbs./sq. in. pressure of the ethylene/propylene monomer gas mixture. The bottle was thereafter agitated for 30 minutes at 70° C. while the pressure was maintained at 60 lbs./sq. in. Within two minutes the solution became viscous; 13 minutes later it had become very viscous and the gas intake was slowing down. At the end of 30 minutes reaction time, agitation and heating were stopped and the bottle was closed off from the rest of the system. After the lines had been vented and disconnected, the bottle was vented to the atmosphere for about 8 minutes. Then a solution of 10 ml. of isopropyl alcohol in 30 ml. of cyclohexane was introduced to deactivate the catalyst. In succession, the viscous polymerization mixture was twice extracted with 100 ml. of 9 N hydrochloric acid, washed once with 100 ml. of distilled water, and poured into 1000 ml. of acetone; the coagulated polymer was filtered off and dried to constant weight at 95° C. 5.5 grams of elastomeric copolymer were obtained analyzing by weight for 59.5% ethylene monomer units, 37% propylene monomer units, and 3.5% 1,4-hexadiene monomer units.

*Example 11*

The pressure apparatus described in Example 4A was employed. After the shaker bottle had been charged with 200 ml. of silica gel-dried nitrogen-sparged toluene, 260.8 mg. of tris(p-chlorophenyl)orthovanadate (giving a 0.0029 molar concentration), and 2 ml. of 1,4-hexadiene (giving a 0.085 molar concentration), it was heated to about 65° C. Then 0.65 ml. of diisobutyl aluminum monochloride was introduced giving a 0.0175 molar aluminum concentration (Al:V was about 6:1). After the mixture had been pressured to 20 lbs./sq. in. with a monomer gas mixture (molar ratio of ethylene:propylene 1:2.6), it was shaken for 1 hour at 70° C. at a pressure of 20 lbs./sq. in. When the catalyst had been deactivated and the copolymer isolated by the procedure described in Example 1 above, 1.5 grams of copolymer were obtained containing 32% by weight propylene monomer units and 4.7% by weight 1,4-hexadiene monomer units.

Any of the polymeric materials set forth in this specification can be prepared by polymerization in the presence of the new catalyst of this invention as hereinbefore described in the preceding Examples 1 to 11.

As many apparently widely different embodiments of this invention may be made without departing from the spirit and scope thereof, it is to be understood that this invention is not limited to the specific embodiments thereof except as defined in the appended claims.

What is claimed is:

1. In the process of preparing a polymeric material by polymerizing in an inert organic liquid a member selected from the group consisting of (a) alpha monoolefin of the formula R—CH=CH$_2$, wherein R is selected from the group consisting of hydrogen and an alkyl radical containing no more than 16 carbon atoms, (b) ethylene with at least one alpha monoolefin of the formula R'—CH=CH$_2$, wherein R' is an alkyl radical containing no more than 8 carbon atoms, and (c) the compounds of (b) with at least one non-conjugated hydrocarbon diene, said diene being a member selected from the group consisting of (1) an aliphatic diene having the formula

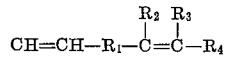

wherein R$_1$ is an alkylene radical, R$_2$ and R$_3$ are independently selected from the group consisting of hydrogen and alkyl and R$_4$ is alkyl and wherein R$_1$ to R$_4$ are so selected that the diene has from 6 to 22 carbon atoms, (2) dicyclopentadiene, (3) 5-alkenyl-substituted-2-norbornene, (4) 5-methylene-2-norbornene, and (5) 2-alkyl-substituted-2,5-norbornadiene, the improvement comprising in combination carrying out the polymerization at a temperature between −30 to +85° C. in the presence of enough vanadium coordination catalyst to give a vanadium content of between 0.00005 to 0.05 molar proportions in the mixture to be polymerized, said catalyst comprising the reaction product of at least 4 molar proportions of an organo aluminum chloride of the formula (alkyl)$_2$AlCl, wherein said alkyl contains no more than 18 carbon atoms, with a molar proportion of tris(p-chlorophenyl)orthovanadate at a temperature between −30 to +85° C. in an inert organic solvent which is selected from the group consisting of hydrocarbon and halogenated hydrocarbon liquid.

2. In the process of claim 1, wherein the polymerization temperature range is 50 to 70° C.

3. In the process of claim 1, wherein the inert organic solvent is an aromatic hydrocarbon.

4. In the process of claim 1, wherein the inert organic solvent is an aliphatic hydrocarbon.

5. The process of claim 4, wherein enough vanadium containing coordination catalyst is present to give a vanadium content of between 0.0005 to 0.005 molar proportions in the mixture to be polymerized.

6. In the process of claim 1, wherein the polymerization liquid and catalyst reaction solvent are tetrachloroethylene.

7. In the process of claim 1, wherein enough vanadium containing coordination catalyst is present to give a vanadium content of between 0.0005 to 0.005 molar proportions in the mixture to be polymerized.

8. A process for preparing ethylene/propylene/1,4-hexadiene copolymer which comprises copolymerizing the respective monomers in an inert organic liquid at a temperature between −30 to +85° C. in the presence of enough vanadium containing coordination catalyst to give a vanadium content of between 0.00005 to 0.05 molar proportions in the mixture to be polymerized, said catalyst comprising the reaction product of at least 4 molar proportions of an organo aluminum chloride of the formula (alkyl)$_2$AlCl, wherein said alkyl contains no more than 18 carbon atoms, with a molar proportion of tris(p-chlorophenyl)orthovanadate at a temperature between −30 to +85° C. in an inert organic solvent which is selected from the group consisting of hydrocarbon and halogenated hydrocarbon liquid.

9. The process of claim 8, wherein the polymerization temperature range is 50 to 70° C.

10. The process of claim 8, wherein the polymerization liquid and catalyst reaction solvent are tetrachloroethylene.

11. A coordination catalyst comprising the reaction product of at least 4 molar proportions of an organo aluminum chloride of the formula (alkyl)$_2$AlCl, wherein said alkyl contains no more than 18 carbon atoms, with a molar proportion of tris(p-chlorophenyl)orthovanadate at a temperature between −30 to +85° C. in an inert organic solvent selected from the group consisting of hydrocarbon and halogenated hydrocarbon liquid.

12. A coordination catalyst comprising the recation product of at least 4 molar proportions of an organo aluminum chloride of the formula (alkyl)$_2$AlCl, wherein said alkyl contains no more than 18 carbon atoms, with a molar proportion of tris(p-chlorophenyl)orthovanadate at a temperature between —30 to +85° C. in tetrachloroethylene.

13. A process which comprises contacting and reacting at least 4 molar proportions of an organo aluminum chloride of the formula (alkyl)$_2$AlCl, wherein said alkyl contains no more than 18 carbon atoms, with a molar proportion of tris(p-chlorophenyl)orthovanadate at a temperature between —30 to +85° C. in an inert organic solvent selected from the group consisting of hydrocarbon and halogenated hydrocarbon liquid and obtaining as a result thereof a polymerization catalyst.

14. The process of claim 13 wherein the inert organic solvent is an aromatic hydrocarbon.

15. The process of claim 13 wherein the inert organic solvent is an aliphatic hydrocarbon.

16. The process of claim 13 wherein the inert organic solvent is tetrachloroethylene.

17. The catalyst system of claim 11, wherein the inert organic solvent is an aromatic hydrocarbon.

18. The catalyst system of claim 11, wherein the inert organic solvent is an aliphatic hydrocarbon.

References Cited by the Examiner

UNITED STATES PATENTS

| 2,933,480 | 4/1960 | Gresham et al. | 260—80.5 X |
| 3,000,866 | 9/1961 | Tarney | 260—80.5 |
| 3,008,948 | 11/1961 | Stampa et al. | 260—94.9 |
| 3,113,115 | 12/1963 | Ziegler et al. | 260—94.9 X |

OTHER REFERENCES

Chemical Abstracts, 52 Col. 19652d–h (1958).

JOSEPH L. SCHOFER, *Primary Examiner.*

JOSEPH R. LIBERMAN, *Examiner.*